(No Model.)

O. D. HARMON.
COMBINATION TOOL.

No. 334,862. Patented Jan. 26, 1886.

Witnesses
R. N. Bishop
Susie H. Seiler

Inventor
Osceola D. Harmon,
By his Attorneys
R. S. & A. P. Lacey

UNITED STATES PATENT OFFICE.

OSCEOLA D. HARMON, OF HOLMESBURG, PENNSYLVANIA.

COMBINATION-TOOL.

SPECIFICATION forming part of Letters Patent No. 334,862, dated January 26, 1886.

Application filed November 17, 1885. Serial No. 183,119. (No model.)

*To all whom it may concern:*

Be it known that I, OSCEOLA D. HARMON, a citizen of the United States, residing at Holmesburg, in the county of Philadelphia and State of Pennsylvania, have invented certain new and useful Improvements in Combination-Tools; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is intended for use principally by horsemen, and aims to provide a single device capable of a number of different uses.

To these ends it consists in the construction hereinafter described, and claimed, and illustrated in the accompanying drawings, in which—

Figure 1:
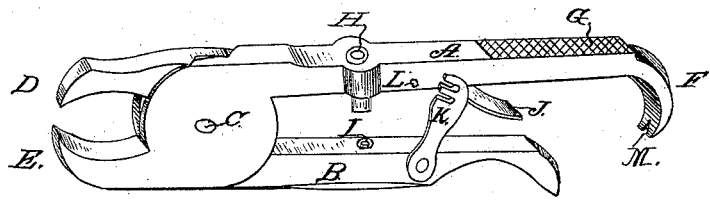
Figure 2:
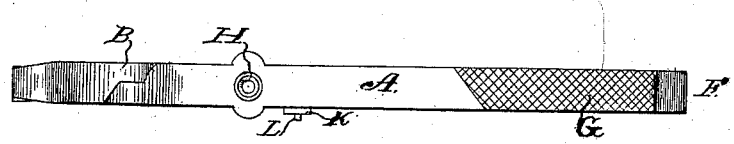

Figure 1 is a perspective view of my device, and Fig. 2 is a top plan view of the same.

My device consists of two levers, A B, constructed as shown, pivoted together near one end, as shown at C, forming long and short arms, as will be understood. The short ends D E of the levers are made to curve toward each other, and are concave on their inner sides, as shown, forming nippers by which broken nails can be drawn from the horse's hoof. The long arms of the levers form handles for operating the nippers. The long arm of the lever A is made longer than the corresponding arm of the lever B, as shown, and the end F is bent around to form a hook by which stones can be drawn from the horse's hoof. A file, G, is formed on the upper side of the lever A, near the hook F, as shown. A tapered tubular punch, H, is screwed into the lever A, and a seat, I, is formed for the same in the lever B, as shown. A flat spring, J, is secured to one of the levers between the two in position to be compressed by the other when the levers are brought together. A hook, K, is pivoted to one of the levers and engages a pin, L, on the other one, thus holding the two together when the device is closed.

The advantages of my device are obvious. The device is made of convenient size to be carried in the vest-pocket. The hook K, engaging the pin L, holds the two levers together and prevents the springs J pressing the two levers apart and preventing the carrying of the device in the pocket. When a stone becomes lodged in the horse's hoof, it can be drawn therefrom by the hook F without opening the device, as the two levers are of different lengths. Should the harness be broken, it can be mended at once by punching a hole through each part by means of the punch H. The nippers and file can be used in a number of ways, and need not be dwelt upon. I have shown the hook F as provided with a claw, M, to enable the more easy withdrawal of nails. This claw may be dispensed with, if so desired, and the hook formed with a straight edge.

Having thus described my invention, what I claim, and desire to secure by Letters Patent, is—

The hereinbefore-described compound tool, consisting of two levers pivoted together near one end and having their short arms bent toward each other to form nippers, and having their long arms of different lengths, the longer one having a hook formed at its end, a punch secured in one lever and a seat therefor formed in the other one, a file formed on the upper side of the longer lever, a spring secured to one lever in position to be compressed by the other lever when the two are brought together, and a hook pivoted on one of the levers and engaging a pin on the other, substantially as described and shown.

In testimony whereof I affix my signature in presence of two witnesses.

OSCEOLA D. HARMON.

Witnesses:
WM. LOVELESS,
FRANK C. DAVIS.